Feb. 18, 1930.  I. L. EDWARDS  1,747,819
ANTIGLARE HEADLIGHT
Filed June 10, 1927
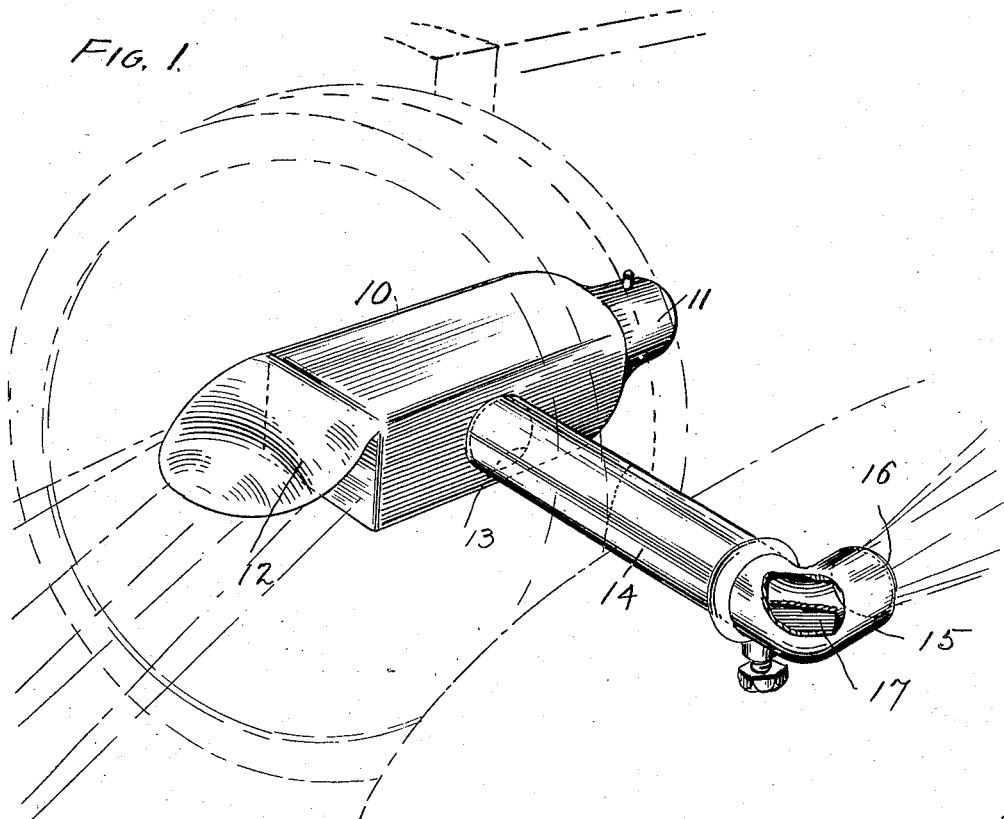
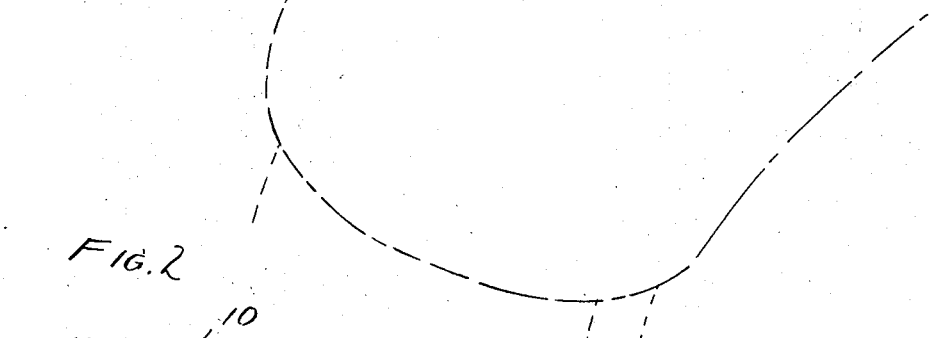

Patented Feb. 18, 1930

1,747,819

UNITED STATES PATENT OFFICE

ISAAC L. EDWARDS, OF AURORA, ILLINOIS

ANTIGLARE HEADLIGHT

Application filed June 10, 1927. Serial No. 197,930.

My invention relates to headlights for motor vehicles and other transportation means where a brilliant light is desirable, and the object of my invention is to provide a lamp construction which with other advantages will possess the one of localizing or concentrating light upon the road or way, so as to amply illuminate the same without such dissemination or glare as to be objectionable to others coming from the direction in which the vehicle is traveling.

My invention consists in whatever is described by or is included within the terms or scope of the appended claim.
In the drawings:

Fig. 1 is a perspective view of a lamp or lighting means embodying my invention;

Fig. 2 is a view partly in side elevation and partly in longitudinal section.
Briefly described, my invention comprehends the combination, as a part of an electric bulb or globe, of a hood or screen that will intercept or prevent the passage of rays from the lamp in all directions except forwardly, downwardly, and to some extent laterally, such hood or screen being situated at the front end of the bulb, and the side walls of the bulb in rear of the hood or screen being opaque or sufficiently opaque as to prevent the transmission therethrough of the light rays, and the inner surfaces of the side walls being preferably reflecting surfaces, so that rays of light striking thereagainst will be directed forward and emitted from the lamp, and thus utilized.
A feature of my invention, especially for automobile use is provision for the transmission forwardly or rearwardly at the side of the vehicle of a signal light for the information of those outside the vehicle, who are concerned in knowing its whereabouts and the direction in which it is moving.

The incandescent lamp bulb, 10, may be of any of the conventional forms but I prefer to make it with flattened sides, and it has at one end the usual plug, 11, for engagement with a suitable socket (which may be that forming a part of the usual headlight reflector) and at the forward end or front has a hood, 12, blown or molded integrally with the bulb, and which extends forwardly and downwardly and laterally with its undersurface suitably curved and silvered or otherwise formed to constitute a reflecting surface, so that forwardly emitted rays of light will encounter the curved underside thereof and be prevented from transmission forwardly and upwardly and laterally over a wide area, and thus an anti-glare condition prevented, and yet the light rays will be focused or brought together and directed forwardly and downwardly to effect the illumination of the roadway directly in front of the vehicle. The top and side walls of the bulb may be colored or otherwise treated to render them opaque or at least be incapable of permitting the passage of an objectionable quantity of light and the inner surfaces are preferably reflecting surfaces which will effect the forward transmission or projection of light rays, and thus utilize them.

To enable some of the light to be used for signal purposes I provide for transmitting a portion thereof from the side of the lamp, and directing the light thus emitted from the lamp either forwardly or rearwardly of the vehicle. To this end a limited portion, 13, of the bulb at one side is translucent and towards the nearer side of the vehicle I extend a tube, 14, say to a position above the front fender, and connect therewith a rearwardly extending tube, 15, to whose rear open end is applied a small lens, 16, which may be red in color and in the bend or angle a mirror or reflector, 17, is placed so that rays of light issuing transversely from the light will be directed rearwardly.

What I claim is:

A lamp for head-lights comprising a glass bulb having at one end an electric socket connection and having top, side and front walls and having a forwardly and downwardly extending integral hood in advance of the front wall of the bulb with its surface towards said front wall a light reflecting surface.

In testimony whereof I hereunto affix my signature.

ISAAC L. EDWARDS.